United States Patent
Bouche et al.

(10) Patent No.: US 6,383,830 B2
(45) Date of Patent: May 7, 2002

(54) OPTICAL COMPONENT HAVING A CHEMICALLY ETCHED GUIDE WITH A RIDGE STRUCTURE AND ITS METHOD OF MANUFACTURE

(75) Inventors: Nicolas Bouche, Chaville; Stéphane Lovisa, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/789,826

(22) Filed: Feb. 22, 2001

(30) Foreign Application Priority Data

Feb. 24, 2000 (FR) .............................. 00 02349

(51) Int. Cl.⁷ .......................... H01L 21/00; G02B 6/10
(52) U.S. Cl. ........................................ 438/31; 385/130
(58) Field of Search .............................. 438/22, 29, 31, 438/46; 372/43, 44, 45, 46, 50; 385/14, 129, 130, 131, 132

(56) References Cited

U.S. PATENT DOCUMENTS 5,834,330 A * 11/1998 Haase et al.

2001/0024547 A1 * 9/2001 Huang et al.

FOREIGN PATENT DOCUMENTS

EP 0 473 443 A2 * 3/1992

* cited by examiner

*Primary Examiner*—Keith Christianson
(74) *Attorney, Agent, or Firm*—Sughrue Mion, PLLC

(57) ABSTRACT

The present invention concerns an optical component having at least one guide with a ridge structure obtained by chemical etching on a substrate made of semiconductor material, the ridge having a base and a top face, the guide having an outline with at least one curved section, the tangent at any point on the outline defining the local orientation (β) of the guide. According to the invention, the width of the base (weff) of the ridge is substantially constant all along the guide and the width of the top face (w) of the ridge varies according to the local orientation (β) of the guide with respect to the reference crystallographic direction (R) of the substrate.

8 Claims, 3 Drawing Sheets

Fig. 1
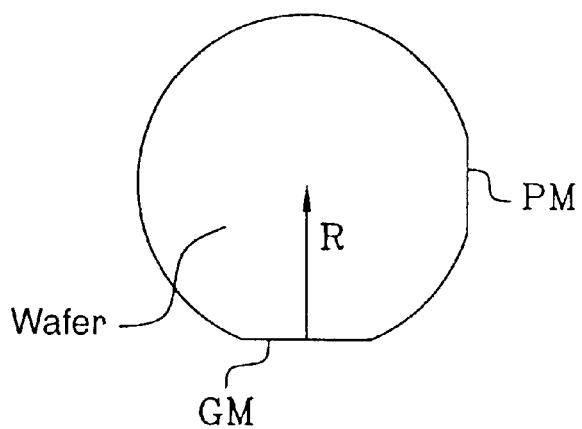
Fig. 2a
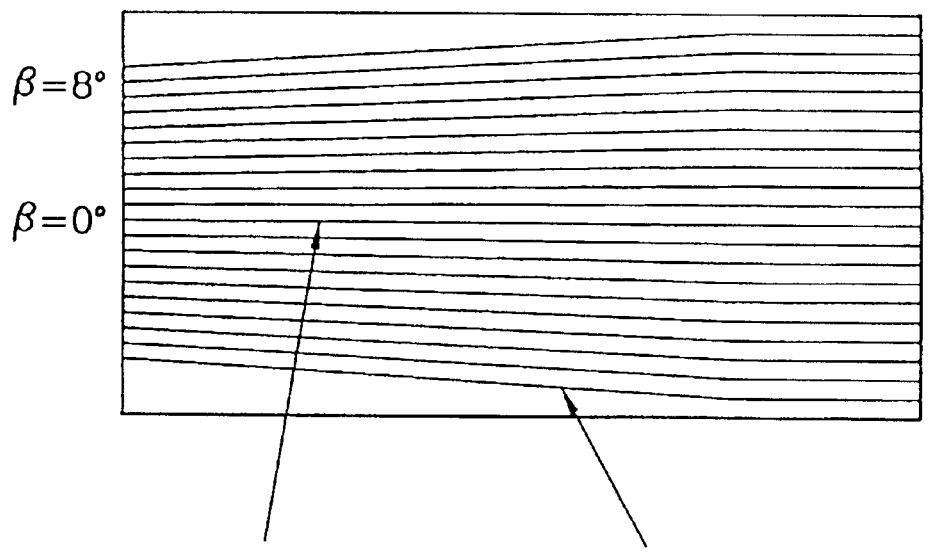
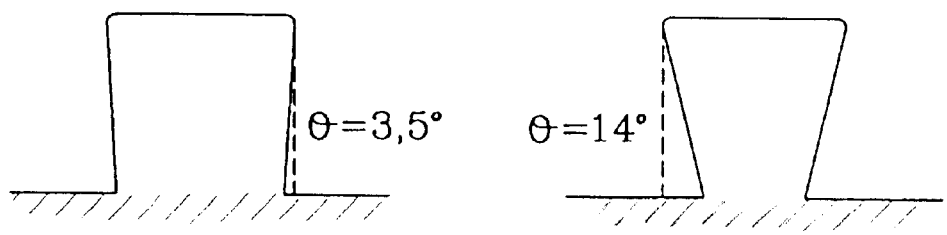
Fig. 2c

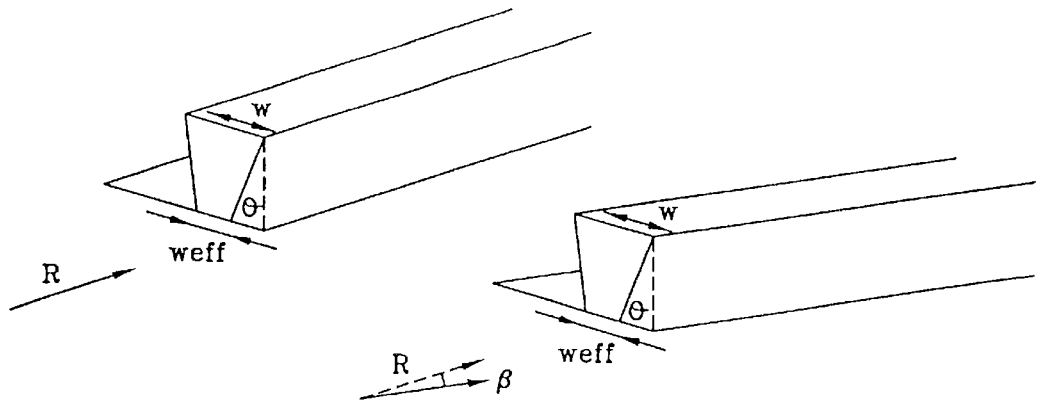
Fig. 2b
Fig. 3a
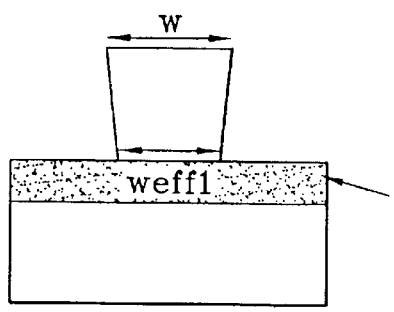
Cleavage in a straight guide
Fig. 3b
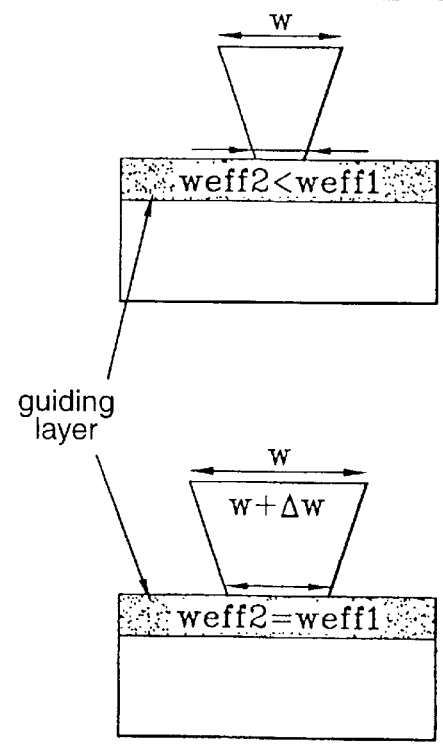
Cleavage in a curved guide
Fig. 3c

OPTICAL COMPONENT HAVING A CHEMICALLY ETCHED GUIDE WITH A RIDGE STRUCTURE AND ITS METHOD OF MANUFACTURE

BACKGROUND OF THE INVENTION

The invention concerns an optical component having a guide with a ridge structure, (know as "ridge waveguide"). The invention applies to such a guide having a curved section.

The invention also concerns a method of manufacturing such a guide.

The field of the invention is that of guides with a ridge structure, chemically etched on a substrate made of semiconductor material and having curved sections, that is to say whose orientation is not parallel to the reference crystallographic direction of the substrate.

When a guide with a ridge structure is chemically etched, the width of the base of the ridge is smaller than the width of its top face. In the case of a guide with curved sections, this difference is variable along the guide and can be accentuated at certain points on the guide. However, the variation in the width of the base of the ridge causes losses in propagation of the guided mode and a change in the effective index of the optical mode of the guide.

One solution consists consequently of seeking to keep the width of the ridge constant, even in a curve. For this purpose, it is possible for example to produce the guide by dry etching. Such a dry etching method makes it possible to produce guides with a ridge structure with a rectangular section at any point in the guide whatever the local orientation of the guide. However, such a dry etching does not make it possible to obtain a ridge structure with the same quality as that obtained by a chemical etching.

In particular, the sides of the ridge are rougher, and the irregularity can be as much as several tens of nanometers in depth.

Moreover, the etching takes longer, a few hours compared with a few minutes for chemical etching.

In addition, the stoppage of the etching is not precisely controlled as in the case of chemical etching.

SUMMARY OF THE INVENTION

The aim of the invention is to propose a chemically etched guide with a ridge structure and having a modal index controlled at any point on the guide, even in curved sections.

The invention is based on a surprising physical observation according to which, in the case of a guide with a ridge structure, the modal index is determined by the width of the base of the ridge.

The object of the invention is more particularly an optical component having at least one guide with a ridge structure obtained by chemical etching on a substrate made of semiconductor material, the ridge having a base and a top face, the guide having an outline with at least one curved section, the tangent at any point on the outline defining a local orientation of the guide, characterised in that the width of the base of the ridge is substantially controlled all along the guide and the width of the top face of the ridge varies according to the orientation of the guide with respect to the reference crystallographic direction of the substrate.

According to one application, for which it is wished to obtain a constant modal index at any point on the guide, the width of the base of the ridge is substantially constant along the curved section of the outline of the guide.

According to one characteristic, the guide is produced on a substrate made of III–V semiconductor material and has a bottom layer stopping the etching made from quaternary semiconductor material.

According to one particularity, the quaternary material is composed of indium-gallium arsenide phosphide (InGaAsP).

The present invention also concerns a method of manufacturing an optical component produced on a substrate made of semiconductor material and having a guide with a ridge structure, the guide having an outline with at least one curved section, the tangent at any point on the outline defining a local orientation of the guide, the said structure being obtained by at least one step of chemical etching through a mask defining in particular the width of the top face of the ridge, characterised in that the said width of the top face varies according to the local orientation of the guide with respect to the reference crystallographic direction of the substrate and according to the required width of the base of the ridge.

According to one characteristic, the chemical etching is effected using a selective chemical solution according to the chemical composition and the crystallographic orientation of the semiconductor materials constituting the guide with a ridge structure. For example, a solution of hydrochloric acid and orthophosphoric acid ($HCl/H_3PO_4$).

BRIEF DESCRIPTION OF THE DRAWINGS

The particularities and advantages of the invention will emerge clearly from a reading of the description given by way of non-limitative example and with regard to the accompanying drawings, in which:

FIG. 1 depicts the directions of a substrate wafer used for the manufacture of the optical component, FIG. 2a depicts a plan view of several chemically etched guides with a ridge structure and having different radii of curvature, FIG. 2b is a perspective view of two guides with a ridge structure, FIG. 2c depicting a view in section of two guides with a ridge structure, FIGS. 3a to 3c depict schematic views in section respectively of a straight guide, a non-corrected curved guide and a corrected curved guide.

DETAILED DESCRIPTION OF THE INVENTION

Figure 4:
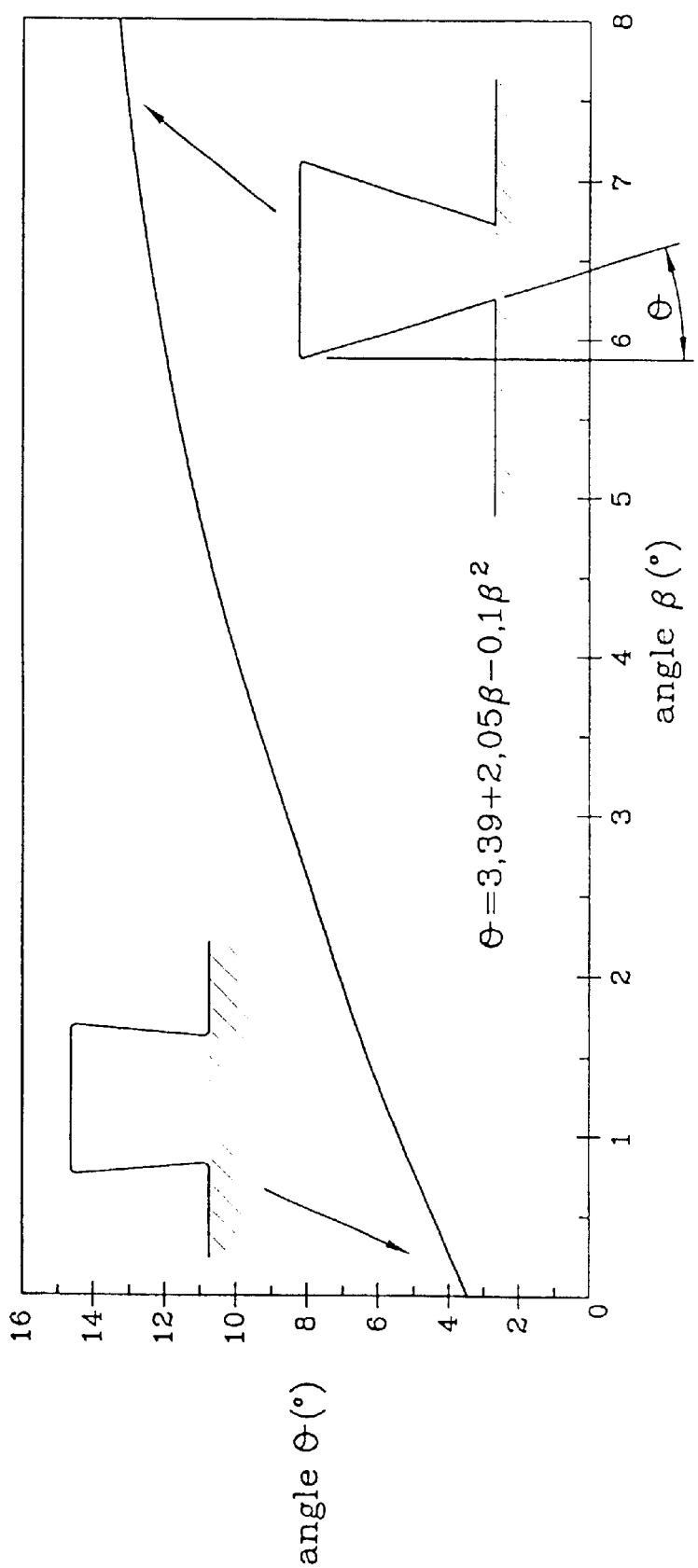
FIG. 4 is a curve representing the inclination $\theta$ of the edges of the ridge according to the orientation $\beta$ of the guide.

FIG. 1 illustrates a substrate wafer used for the manufacture of optical components and in particular guides with a ridge structure according to the invention.

Subsequently, a guide with a ridge structure will simply be referred to as a ridge.

Such a wafer is composed of a crystalline material consisting of a III–V semiconductor compound such as indium phosphide (InP) for example. In order to reference the crystallographic directions of the wafer, the latter generally has a large flat GM and a small flat PM. The direction perpendicular to the large flat in the plane of the wafer is generally chosen as the reference direction R, this direction generally corresponding to a direction of the crystal.

FIGS. 2a to 2c illustrate the phenomenon caused by the curvature of the guides with a ridge structure. Several guides have been etched on the wafer with different orientation directions.

The orientation of the guides is defined by the direction of the tangent to the curvature at a given point on the outline of the guide. The orientation directions are therefore variable with respect to the reference crystallographic direction R of the wafer. FIGS. 2b and 2c illustrate the effects of the curvature of the guides on the shape of the ridges.

The ridges depicted in plan view in FIG. 2a have an orientation direction which forms an angle $\beta$ with respect to the reference direction R. This angle $\beta$ will hereinafter be referred to as the local orientation of the ridge since it depends on a given point on the guide.

The central ridge is such that $\beta=0°$. The other ridges are disposed symmetrically on each side of the central ridge in order to more easily show the curvature, but such an arrangement is not necessarily automatic. For the most off-center ridge, the orientation $\beta$ is approximately 8°.

FIG. 2b depicts a perspective view of two ridges. The angle of inclination which the edge of the ridge makes with the vertical is designated $\theta$, the width of the top face of the ridge is designated w, and the width of the base of the ridge is designated weff.

The view in section depicted in FIG. 2c shows different angles $\theta$ and base widths weff for points on two ridges with different local orientations. In the case of a ridge oriented in the reference direction R, such that $\beta=0°$, the angle $\theta$ measured is approximately 3.5° and the width of the base weff is almost identical to the width of the top face w. On the other hand, in the case of a ridge whose orientation direction is inclined with respect to the reference direction R, such that $\beta=8°$, the inclination of the edge $\theta$ is as much as 14° and the width of the base weff is appreciably smaller than that of the top face w.

FIGS. 3a to 3c illustrate more specifically the particularities of the guides with a ridge structure having an outline with curved sections and present in detail the solution afforded by the invention for controlling the width of the base weff of the ridge with a view to preventing its decrease in the curved sections.

FIG. 3a is seen in a section of a straight portion of a guide. A width of the base weff1 and a width of the top face w is then obtained.

FIG. 3b is a view in section of a curved portion of a non-corrected guide. It can be seen that the width of the base weff2 at this point on the guide is smaller than that weff1 of a point situated on a straight portion of the guide, for the same width of the top face w.

FIG. 3c is a view in section of a curved portion of a corrected guide according to the invention. It can then be seen that the width of the base weff2 at this point on the guide is equal to that weff1 of a point situated on a straight portion of the guide, in spite of the local curvature of the guide. For this purpose, it has been necessary to increase the width of the top face w by $\Delta w$.

The invention proposes to vary the width of the top face w of the ridge according to its orientation $\beta$ by means of an adapted mask.

The height of the ridge is constant over the entire guide. The width of the base of the ridge weff therefore depends directly on the inclination of the edges $\theta$ and on the width of the top face w. Thus, the greater the inclination $\theta$, the smaller the width of the base weff for the same width of the top face w.

To keep the width of the base weff constant, it is then necessary to increase the width of the top face w in order to compensate for the inclination of the edges $\theta$.

However, it has been established that the inclination $\theta$ depends itself on the local orientation $\beta$. It is consequently possible to establish a relationship between the local orientation $\beta$, the width of the base weff and the width of the top face w. Thus, from an orientation $\beta$ imposed on the guide, it is possible to control the width of the base weff by varying the width of the top face w.

In FIG. 4 there are entered the measurements of the inclination of the edges of a ridge $\theta$ according to its local orientation $\beta$ with respect to the reference direction R.

These measurements have been established for ridges chemically etched by means of a selective chemical solution. Such a solution acts selectively on the semiconductor materials according to their chemical composition and their crystallographic orientation. This means that only certain materials will be attacked by the solution.

The measurements entered on this FIG. 4 were obtained by applying a solution consisting of a mixture of hydrochloric acid and orthophosphoric acid ($HCl/H_3PO_4$). In the example in question, the guide consists of a superimposition of layers composed successively of InP (indium phosphide), InGaAsP (indium-gallium arsenide phosphide), InP and InGaAsP. Under these conditions, a good approximation of the portion of curve giving the angle $\theta$ according to the angle $\beta$ is in the form:

$$ti\ \theta = 3.39 + 2.05\ \beta - 0.1\ \beta^2,$$

the angles $\beta$ and $\theta$ being expressed in degrees.

With another chemical etching solution, other coefficients would be obtained, or even another function linking $\theta$ and $\beta$.

It has been possible to establish a relationship between the orientation of the guide and the widths of the base weff and of the top face w of the ridge, and a relationship between the angles $\beta$ and $\theta$. In order to be able to control the width of the base weff of the ridge and thus avoid excessive propagation losses, in particular in the curved sections of the guide, the width of the top face w of the ridge is varied.

To allow a variation in the width of the top face w of the ridge, it is possible to design a mask for manufacturing a guide having a curved outline whose width is variable. The programming of such a mask will be more complex because of this variable width, but this drawback however arises only once, during the programming. The method of manufacturing a guide with a ridge structure according to the invention therefore remains advantageous.

In one example embodiment, the guide can consist of a substrate made of III–V semiconductor materials such as InP, covered with a first layer of a ternary or quaternary III–V semiconductor material which stops the etching, such as InGaAsP, on which there are superimposed a layer of a III–V compound such as InP and then another layer of a ternary or quaternary material, possibly of the same composition, or otherwise in the same proportion as the first layer of ternary or quaternary material.

The invention applies not only to the optical components produced on substrates made of III–V materials cited above, but also to any design on materials with a crystalline structure used normally for the manufacture of optical components, that is to say II–VI and IV—IV materials.

According to a conventional manufacturing method, the mask will make it possible to deposit, in accordance with the required configuration, a layer of resin with a width w resisting the chemical etching to which the guide will be subjected for etching the ridge structure.

What is claimed is:

1. An optical component having at least one guide with a ridge structure obtained by chemical etching on a substrate made of semiconductor material, the ridge having a base and a top face, the guide having an outline with at least one curved section, the tangent at any point on the outline defining a local orientation of the guide ($\beta$), characterised in that the width of the base (weff) of the ridge is substantially controlled all along the guide and the width of the top face (w) of the ridge varies according to the orientation ($\beta$) of the guide with respect to the reference crystallographic direction (R) of the substrate.

2. A component according to claim 1, characterised in that the width of the base (weff) of the ridge is substantially constant along the curved section of the outline of the guide.

3. A component according to claim 1, characterised in that the guide is produced on a substrate made of III–V semiconductor material and has a bottom stop layer made from quaternary semiconductor material.

4. A component according to claim 3, characterised in that the quaternary material is composed of indium-gallium arsenide phosphide (InGaAsP).

5. A method of manufacturing an optical component produced on a substrate made of semiconductor material and having a guide with a ridge structure, the guide having an outline with at least one curved section, the tangent at any point on the outline defining a local orientation ($\beta$) of the guide, the said structure being obtained by at least one step of chemical etching through a mask defining in particular the width of the top face (w) of the ridge, characterised in that the said width (w) of the top face varies according to the local orientation $\beta$ of the guide with respect to the reference crystallographic direction (R) of the substrate and according to the required width of the base (weff) of the ridge.

6. A method according to claim 5, characterised in that the width (w) of the top face of the ridge along the curved section of the outline vary so that the width (weff) of the base of the ridge is constant.

7. A method according to claim 1, characterised in that the chemical etching is carried out using a selective chemical solution according to the chemical composition and the crystallographic orientation of the semiconductor materials constituting the guide with a ridge structure.

8. A method according to claim 7, characterised in that the chemical solution is a solution of hydrochloric acid and orthophosphoric acid ($HCl/H_3PO_4$).

* * * * *